Aug. 1, 1939.   M. SOVIS   2,167,962

VISOR BRACKET CONSTRUCTION

Filed June 28, 1937

Inventor
Milo Sovis
By Livenance and Van Antwerp
Attorneys

Patented Aug. 1, 1939

2,167,962

UNITED STATES PATENT OFFICE 2,167,962

VISOR BRACKET CONSTRUCTION

Milo Sovis, Grand Haven, Mich., assignor to Peerless Novelty Company, Grand Haven, Mich., a corporation of Michigan Application June 28, 1937, Serial No. 150,672

3 Claims. (Cl. 248—288)

This invention relates to a visor bracket which in use is mounted at a front upper corner and within an automobile body. The bracket has structure so that the visor carried thereby may be swung to a position of use immediately back of the windshield or to another position paralleling a front door of the body, in either of which positions it may be turned downwardly to exclude glare of the sun. The visor may also when not needed for glare excluding purposes be turned upwardly and out of the way and lie substantially against the underside of the top.

My invention is directed to a visor of the character noted and in which the visor carrying bracket is economically produced, may be readily installed and when installed the visor may be swung to either of the positions mentioned, and when it is not in use is capable of an adjustment so as to give the best relative position of the visor to the underside of the top of the body snugly conforming thereto and not being spaced away therefrom.

This invention is for use in connection with visors in the same place as in the co-pending application of Henry G. Keller, Ser. No. 150,731, filed June 28, 1937. With the construction of visor bracket which I have invented the bracket may be used with different forms and shapes of automobile bodies by slightly modifying the elements of structure and may be used at either the right or left-hand side of the body with very simple variations in such elements. This provides a practical structure which is economcal to produce.

An understandng of the invention may be had from the following description, taken in connection with the accompanying drawing, in which, Fig. 1 is an elevation of the visor bracket showing it mounted at an upper front corner and within an automobile body, the bracket carrying a visor element which may be turned down into its operative position or which may be turned upwardly to lie against the upper side of the top.

Like reference characters refer to like parts in the different figures of the drawing.

Figure 1:
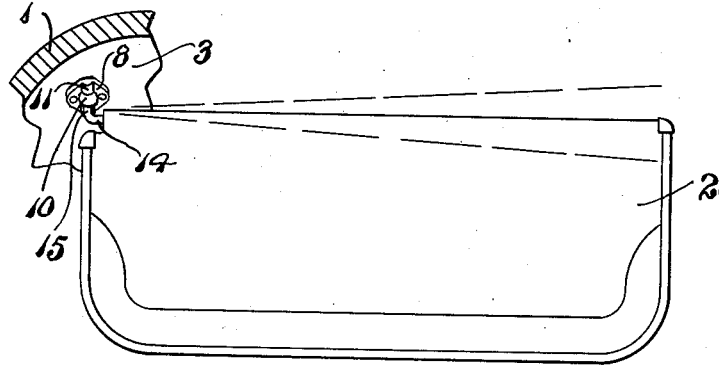

The bracket of my invention is adapted to be attached within an automobile body 1 above and at the rear and adjacent either end of the windshield 2. The inner side 3 of the body, normally covered with a fabric cover 4, in the form of structure shown in Figs. 1 to 8, inclusive, is pressed upwardly as indicated at 5 to make a shallow concaved recess in the underside of said part 3.

The bracket which is to be secured to the automobile body includes a plate 6 which, between its ends and at its intermediate portion, is pressed upwardly making a concave recessed portion 7 which snugly fits into the underside of the recess in the part 5 previously described.

Figure 4:
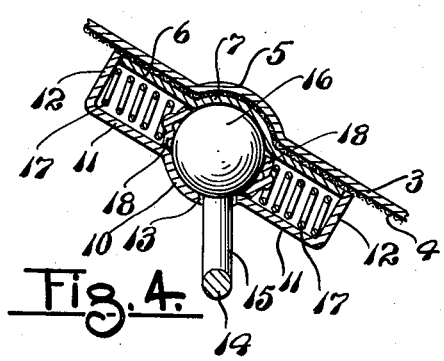
Fig. 4 is a section taken substantially at right angles to the plane of the section shown in Fig. 3.
Figure 5:
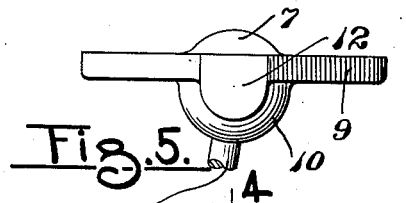
Fig. 5 is an edge elevation of the bracket.
Figure 6:
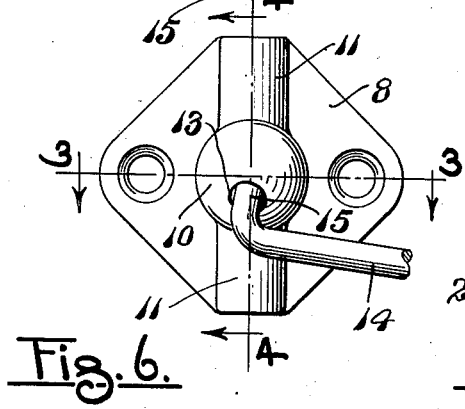
Fig. 6 is an underplan view thereof.
Figures 7, 8:
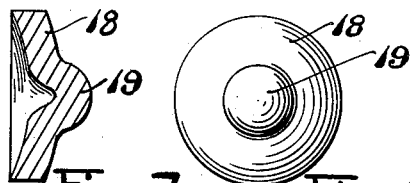
Figs. 7 and 8 are respectively, a sectional and an elevation of a friction shoe, two of which are used in the structure.

A second plate 8 of sheet metal is provided of a shape to overlap and house the plate 6 and is formed at its edges with flanges 9 to cover the edges of the inner plate 6. This plate 8 is of substantially rectangular form, the same as the plate 6, and at its central portion is pressed downwardly into a semi-spherical socket portion 10 which comes directly opposite the upwardly pressed concaved portion 7 of the plate 6 when the two plates are assembled together. The plate 8 also is formed with oppositely extending troughs 11 pressed from the sheet metal, the outer ends of which are closed as indicated at 12, these troughs extending away from the socket 10 in opposite directions and in alinement with each other. The socket portion 10 has an opening 13 therethrough which is made in the socket in such a position that when the plates 6 and 8 are attached to the body in an upper front corner of said body and, therefore, must occupy an inclined position substantially as shown in Fig. 4, the axis of the opening 13 is substantially vertical.

Figure 3:
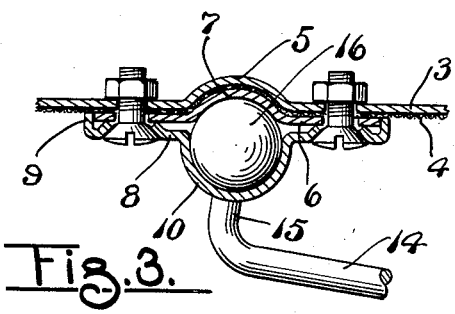
Fig. 3 is a transverse section substantially on the plane of line 3—3 of Fig. 6.

A visor carrying rod 14 has one end portion 15 thereof bent upwardly to pass through the opening at 13. Such part 15 is permanently connected at its upper end to a ball 16 which is located in the socket 10 and at its upper side fits into the concaved recess portion 7 of the plate 6. Suitable screws, as shown in Fig. 3, pass through both plates 6 and 8 and through the header portion 3 of the automobile body for securing the parts together in assembled relation. The troughs 11 each serve as a housing for a coiled spring 17, the outer ends of the springs bearing against the closure portions 12 and the inner ends bearing each against a shoe 18 shaped at one side to conform to the spherical surface of the ball 16 and being provided at their centers with outwardly extending projections 19 around which the innermost coils of the springs are located. These springs under compression press the shoes snugly against the opposite sides of the balls 16 and serve as friction brakes upon said ball to yieldingly hold the ball and the connected rod 14 in any position to which moved. The opening at 13 is larger in diameter than the diameter of the rod 14 so that the rod 14 as a whole may be swung from front to side position by rotating about the axis of the vertical end portion 15, and also the rod may have a limited universal movement in other directions so that its outer free end may be tilted a short distance both above and below a horizontal plane.

Figure 2:
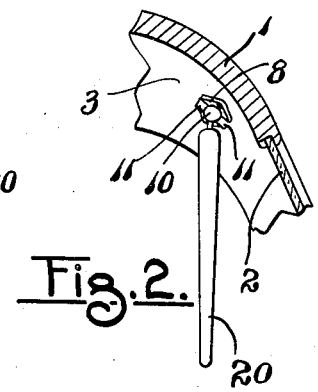
Fig. 2 is an end elevation of the structure shown in Fig. 1.

The usual rectangular shaped visor 20 is mounted at one edge on the substantially horizontal rod 14 in a manner such that the visor may be swung from its suspended and vertical position shown in Figs. 1 and 2 through an arc of approximately 90° to horizontal position, or above horizontal position, to lie against the underside of the top of the car. And by tilting the rod 14 to a position between its extremes of movement shown by the dash lines in Fig. 1 the free edge of the visor may be made to conform substantially exactly to the underside of the top of the car when it is swung upwardly to inoperative position. Also, the rod 14 with the visor element thereon can be turned through substantially 90° about a vertical axis of the part 15 so as to serve as a glare shield against the sun's rays coming from the side through the glass of the front door of the automobile and in such position the visor element 20 may likewise be swung upwardly and by adjustment of the rod 14 the visor conformed to the underside of the body top.

Figure 9:
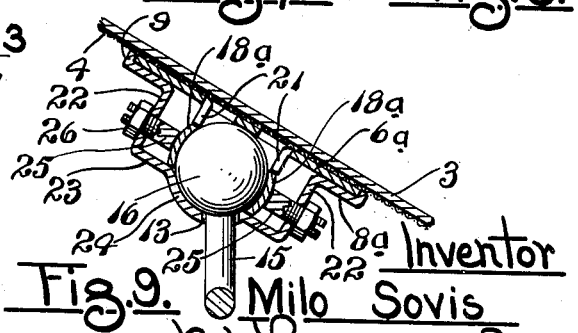
Fig. 9 is a section similar to Fig. 4 of a modified form embodying the invention.

In Fig. 9 an equivalent structure is shown. In this case the header portion 3 of the body does not have the concave recessed part 5 made therein. The plate 6 is provided with spaced apart downwardly extending tongues 21 which come against the upper edges of the shoes 18a, one at each side of the ball 16. The lower plate 8a has the same covering flanges 9 as previously described, but at its intermediate portion is pressed downwardly to make sides 22 connected by a bottom 23 in which a shallow downwardly pressed concaved portion 24 is provided in which the opening 13 is made. The shoes 18a have their lower edges against the upper side of the bottom 23, and as previously stated, their upper edges come against the lower ends of the tongues 21. Screws 25 pass through the parts 22 and come against the shoes 18a to press the same with greater or less force against the ball 16. Said screws are retained in adjusted position by locking nuts 26.

With this construction there is no need of cutting any opening through the part 3 of the top of the body but the bracket can be applied directly thereto and secured in place. The ball is frictionally braked against movement, the brake shoes acting upon the ball 16 will snugly hold the ball, the connecting rod 14 and the visor thereon in any position to which adjusted. The structure is economical to produce, most of the parts being stamped from sheet metal, while the rod is cut from stock material and requires only to be bent to make the end portion 15 at right angles to the body of the rod 14, and attached to the ball 16 which is likewise of stock form.

The invention is defined in the appended claims and is to be considered comprehensive of all forms of structure coming within their scope.

I claim:

1. In a device of the class described, an inner plate, an outer plate opposed to the inner plate, said plates having oppositely recessed portions adapted to have a ball set therein, a ball seated between said plates in said recessed portions, said outer plate having an opening in the recessed portion thereof and provided with troughs extending in opposite directions from said recessed portion, a rod connected to the ball extending through said opening, the diameter of the rod being less than the diameter of the opening, and friction means in said troughs bearing against opposite sides of the ball, combined with means for pressing said means against said ball.

2. In a device of the class described, an inner plate, an outer plate opposed to said inner plate, said outer plate having an opening therethrough, a ball mounted between said plates, a rod connected to said ball extending through said opening in the outer plate, said outer plate provided with troughs extending in opposite directions from said opening, and friction means in said troughs pressing against said ball, as and for the purposes specified.

3. In a device of the class described, a support, a plate opposed to and spaced from said support provided with a trough extending transversely thereof having closed outer ends, a ball located between said support and plate in said trough, friction shoes in said trough, and compression springs extending from the closed ends of said trough to said shoes to urge same against said ball, whereby the ball will be maintained in any desired position.

MILO SOVIS.